United States Patent [19]

Gaffney et al.

[11] Patent Number: 5,645,290
[45] Date of Patent: Jul. 8, 1997

[54] STACKABLE STROLLER

[75] Inventors: Edward J. Gaffney, Pewaukee; Thomas R. Wargin, Milwaukee, both of Wis.

[73] Assignee: Ortho-Kinetics, Inc., Waukesha, Wis.

[21] Appl. No.: 706,981

[22] Filed: Sep. 3, 1996

Related U.S. Application Data

[63] Continuation of Ser. No. 332,347, Oct. 31, 1994, abandoned.

[51] Int. Cl.$^6$ ........................................ B62B 7/00
[52] U.S. Cl. .................... 280/33.998; 280/47.4; 280/79.2; 296/97.21
[58] Field of Search .............. 280/33.998, 33.991, 280/1.191, 1.208, 1.186, 1.23, 1.22, 47.34, 47.38, 47.35, 47.4, 79.2, 87.05, 87.01; 414/788.2; 446/431, 470, 471, 71, 75, 117, 128, 450, 451; 296/99.21

[56] References Cited

U.S. PATENT DOCUMENTS

| | | | |
|---|---|---|---|
| D. 148,265 | 12/1947 | Wheeler . | |
| D. 155,025 | 8/1949 | Nanna | 280/648 |
| D. 157,737 | 3/1950 | Chance | D12/129 |
| D. 172,946 | 9/1954 | Barela | D34/15 |
| D. 305,011 | 12/1989 | Pipon | D12/129 |
| D. 332,592 | 1/1993 | O'Dea et al. | D12/129 |
| 1,401,085 | 12/1921 | Kilmer | D14/3 |
| 3,346,271 | 10/1967 | Parsons | 280/33.998 |
| 3,425,709 | 2/1969 | Fields | 280/79.2 |
| 3,734,526 | 5/1973 | Propst | 280/33.998 |
| 5,261,690 | 11/1993 | Kluber | D34/15 |
| 5,354,079 | 10/1994 | Hettenbach | 280/33.991 |
| 5,445,396 | 8/1995 | Sebor | 280/33.998 |
| 5,474,483 | 12/1995 | Sun | 280/33.998 |

FOREIGN PATENT DOCUMENTS

| | | | |
|---|---|---|---|
| 1158632 | 6/1958 | France | 280/33.998 |
| 1315823 | 12/1962 | France | 280/33.998 |
| 2308535 | 11/1976 | France | 280/33.998 |
| 0296211 | 4/1954 | Switzerland | 280/33.998 |
| 0727568 | 4/1955 | United Kingdom | 280/33.998 |
| 1119652 | 3/1965 | United Kingdom | 280/33.998 |

OTHER PUBLICATIONS

Photograph showing stacking of representative prior art strollers.
Imperial Commerical Stroller Brochure (Undated).
Kiddie Kab Strollers Brochure (Undated).
Scooter Bug Stroller Brochure (Undated).

*Primary Examiner*—Anne Marie Boehler
*Attorney, Agent, or Firm*—Ryan, Maki, Mann & Hohenfeldt, SC

[57] ABSTRACT

A stroller includes a rounded vacuum formed body having a top opening capable of substantially enclosing an occupant, the body having at least one upwardly extending projection. A frame is attached to the body having wheels attached thereto and a handle assembly is attached to the rear of the stroller for pushing the same. A horizontal cross member is attached to the frame and positioned, in alignment with the rearwardmost surface of the upwardly extending projection whereby when one of the strollers is placed upon the other, the crossmember engages the projection and enables the nesting of one of the strollers atop the other.

5 Claims, 3 Drawing Sheets

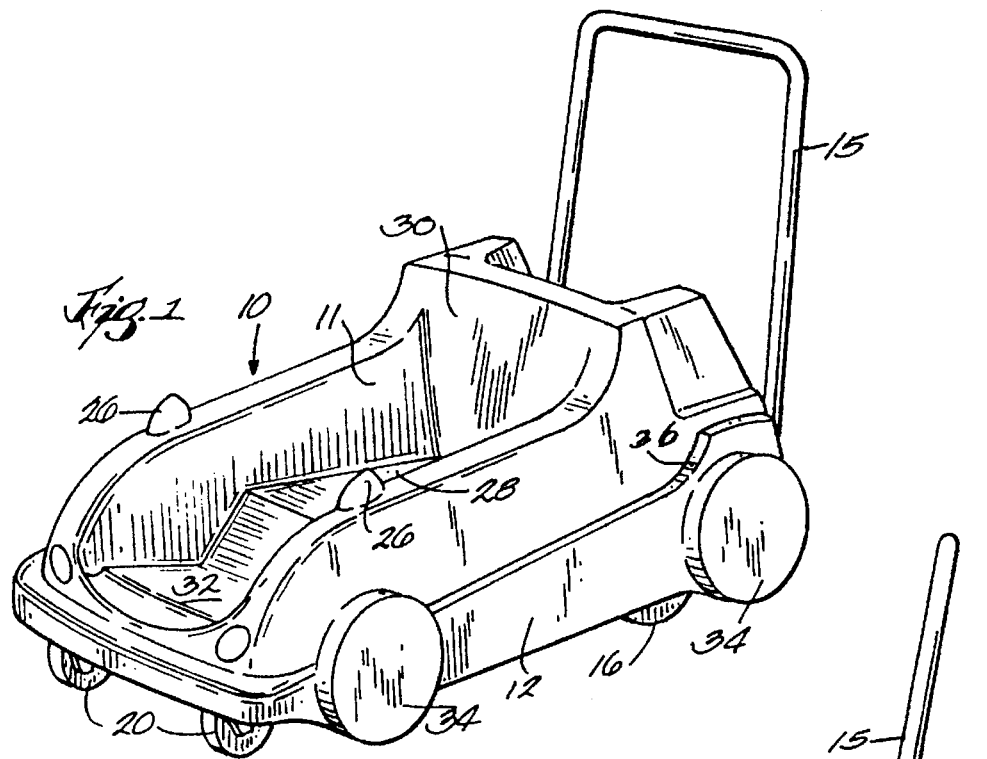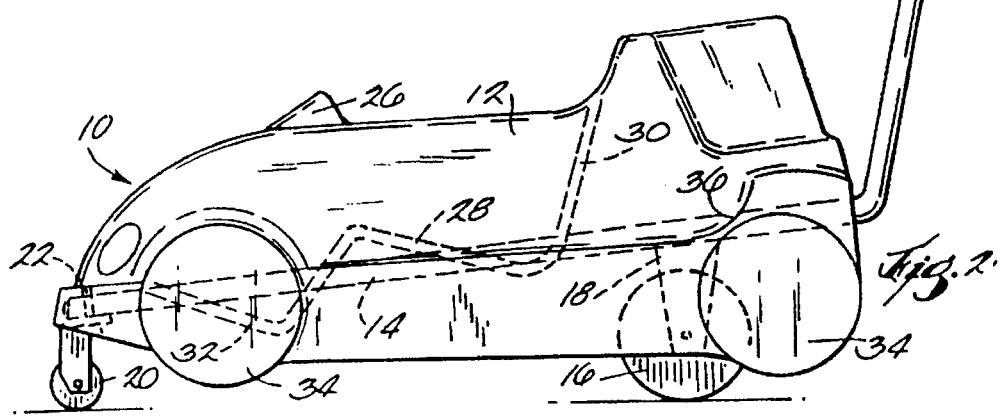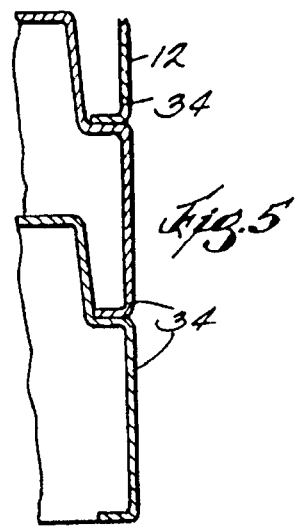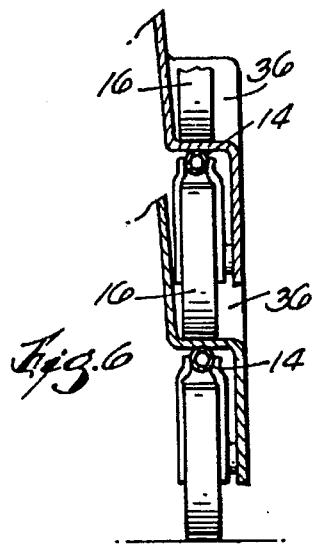

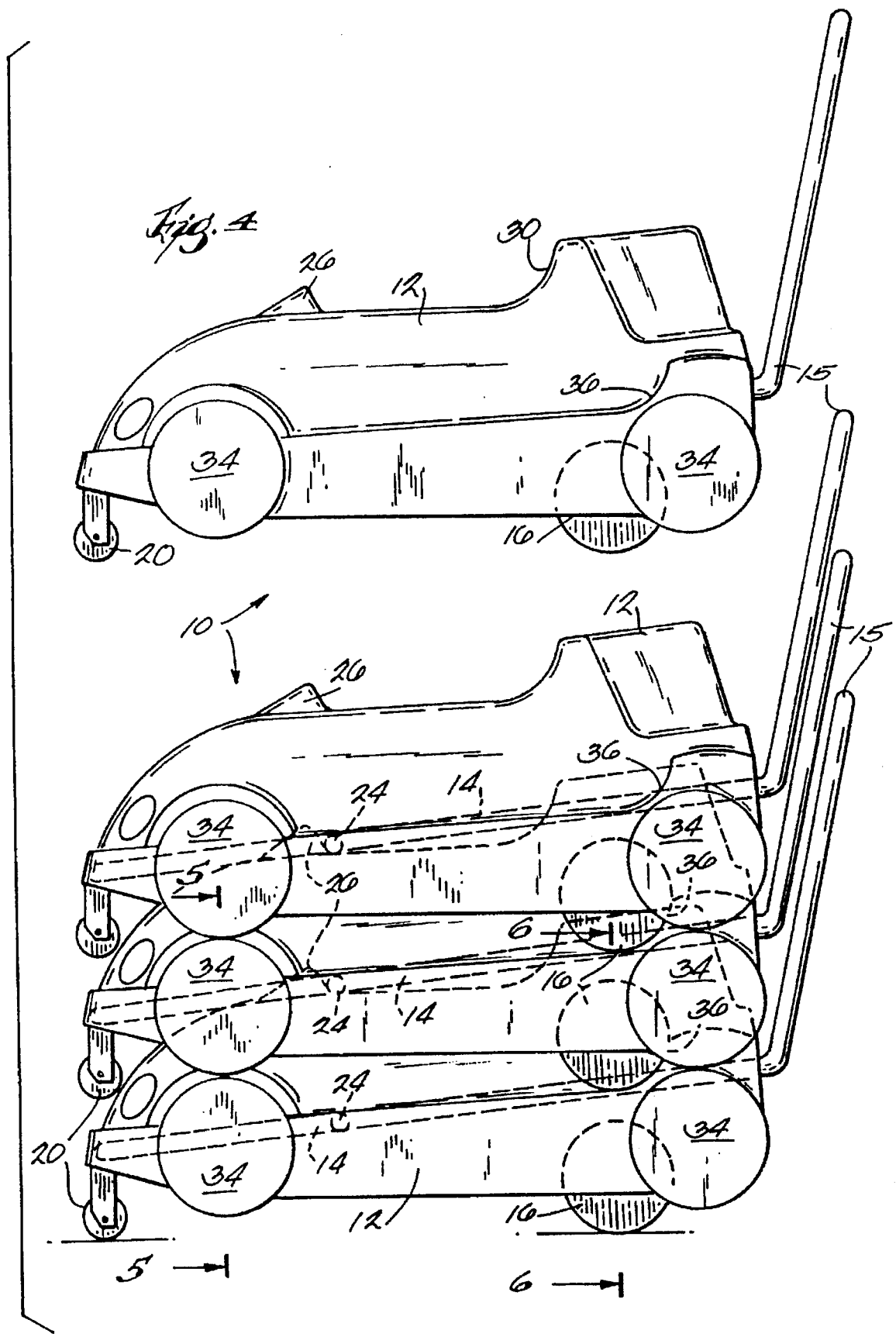

STACKABLE STROLLER

This is a continuation of application Ser. No. 08/332,347 filed on Oct. 31, 1994, now abandoned.

FIELD OF THE INVENTION

This invention relates to strollers and more particularly pertains to a new and improved stroller formed in the shape of a small motor vehicle with a rounded body but which is vertically stackable with other identical strollers.

BACKGROUND OF THE INVENTION

Strollers have long been used to transport small children who are unable to walk for extended periods of time in order to relieve the parent or custodian from having to carry the child. Public areas such as amusement or theme parks often provide infant strollers to their patrons on a rental basis. Since storage space is at a premium in such areas, it is necessary or highly desirable that the strollers can be stacked one atop the other in order to preserve space. Thus, various collapsible strollers, for example, have been provided with the ability to be stacked often in opposite directions.

It is desirable in an amusement part setting to provide a stroller that, for example, resembles a small automobile or other theme device such as, for example, an animal or a whale. Due to the shape of such vehicles, in the past the same were not stackable, however, thus a need has existed for a stroller that is shaped in the form of a theme or entertainment device, such as automobile, which nonetheless can be stacked.

SUMMARY OF THE INVENTION

A stroller comprises a rounded body having a top opening capable of substantially enclosing an occupant. The stroller includes a frame attached to the body having a pair of front and rear wheels. A handle assembly is attached to the rear of the stroller for pushing the stroller. The body has at least one upwardly extending projection located, in a front to rear position, between the pair of front and rear wheels. A horizontal cross member is attached to the frame. The horizontal cross member is located, in a front to rear position, between the pair of front and rear wheels and in alignment with the rearwardmost surface of the upwardly extending projection. Thus, when the strollers are placed one atop the other, the crossmember of a first stroller positioned atop a second stroller engages the upwardly extending projection of the second stroller and enables the nesting of the strollers one atop the other.

Further objects and advantages of the invention will become apparent from the appended detailed description and claims and accompanying drawings.

BRIEF DESCRIPTION OF THE DRAWINGS

FIG. 1 is an isometric view of a stroller in accordance with the invention;

FIG. 2 is a side elevational view of the stroller of FIG. 1;

FIG. 4 is a side view showing a plurality of strollers of the present invention in stacked orientation;

FIG. 5 is a fragmentary sectional view taken along line 5—5 of FIG. 4 and;

FIG. 6 is a fragmentary sectional view taken along line 6—6 of FIG. 4.

DETAILED DESCRIPTION OF A PREFERRED EMBODIMENT

Figure 3:
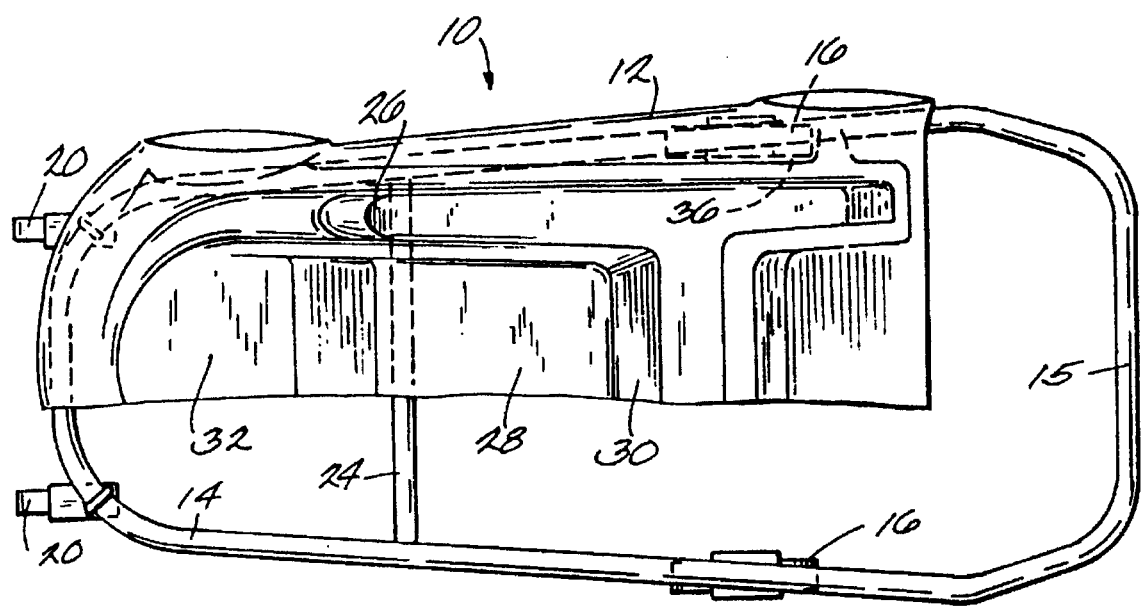
FIG. 3 is a top view of the stroller of FIG. 1 with parts broken away in order to show the interior details.

Referring more specifically to the drawings there is seen a stroller 10 of this invention having an infant supporting body component 12 which is preferably formed as a one piece plastic molding. Preferably the body 12 is manufactured by a vacuum forming process, by other techniques can be used, as will be appreciated by those skilled in the art. Body 12 is supported on a frame 14 preferably formed 5 from tubular metal such as steel.

Attached to the rearward end of frame 14 is a generally U-shaped handle 15 provided for pushing stroller 10. While shown as being rigidly affixed to frame 14, handle 15 could be pivotally attached instead, if desired. A pair of wheels 16 is mounted on struts 18 and oriented parallel to the longitudinal axis of stroller 10. A pair of front wheels 20 are pivotally mounted in sockets 22 at the forward end of frame 14 and act as pivotable caster wheels which enable turning of the stroller when it is in motion. Integral with frame 14 is a cross member 24. Upwardly projecting protrusions 26 are provided on each side of the body 12 on its upper surface.

Body portion molding 12 includes a seat 28 provided in a size adapted to support an infant. Also, provided in the molded structure are a backrest 30 and footrest 32 to support the seated infant. Also molded into the structure of body 12 are false wheels 34 which assist in giving the stroller 10 the appearance of a small motor vehicle as do the provision of other automotive features such as headlights, bumpers, etc.

Referring to FIGS. 3–6, the stackability of the strollers one atop the other is illustrated. It will be noted that crossmember 24 of each stroller is positioned in alignment with the rearward surface of projections 26. The engagement of the rear of projections 26 of a first stroller by crossmember 24 of a second stroller stacked atop the first stroller prevents the second stroller from moving forward. Also, as seen in FIGS. 4 and 5, the front false wheels 34 are sized so that they stack one atop the other and assist in maintaining the uniformity and stability of the stack of strollers.

Finally, the rearward part of each body 12 is provided with a curved indentation 36 which is adapted to engage the rear wheels 16 of a stroller stacked above, i.e. so that the wheels 16 of the upper stroller in the stack engage the indentations 36 on each side of the body 12 of the next lower stroller in the stack.

What is claimed is:

1. A stroller comprising a rounded body having a top opening capable of substantially enclosing an occupant;

a frame attached to said body having a pair of front wheels and a pair of rear wheels attached thereto;

a handle assembly attached to the rear of said stroller for pushing the same;

said body having at least one upwardly extending projection located, in a front to rear position, between said pair of front wheels and said pair of rear wheels a horizontal cross member attached to said frame and located, in a front to rear position, between said pair of front wheels and said pair of rear wheels and in alignment with a rearwardmost surface of said upwardly extending projection whereby, when a first one of said strollers is placed atop a second one of said strollers, said crossmember of the first stroller engages said upwardly extending projection of the second stroller and enables the nesting of the first stroller atop the second stroller.

2. A stroller according to claim 1 wherein said body comprises a formed plastic molding and includes a seat for supporting a passenger.

3. A stroller according to claim 1 wherein said handle is in the shape of a generally U-shaped inverted tubular member attached to said frame.

4. A stroller comprising a rounded body having a top opening capable of substantially enclosing an occupant, said body having at least one upwardly extending projection;

a frame attached to said body having wheels attached thereto;

a handle assembly attached to the rear of said stroller for pushing the same;

a horizontal cross member attached to said frame and positioned, in a front to rear position, with a rearward most surface of said upwardly extending projection whereby, when a first one of said strollers is placed atop a second one of said strollers, said crossmember of the first stroller engages said upwardly extending projection of said second stroller and enables the nesting of the first stroller atop the second stroller, said stroller further comprising front and rear pairs of wheels, and wherein said body includes curved indentations on each side sized and positioned to nestingly receive the rear wheels of a similar stroller stacked atop said stroller.

5. A stroller according to claim 4 wherein said body includes cylindrical protrusions providing the appearance of motor vehicle wheels on the opposite sides of said stroller body, said protrusions being stackable above and in contact with each other when one of said strollers is stacked atop another.

* * * * *